United States Patent

[11] 3,573,502

[72] Inventor David T. Kan
Albany, Calif.
[21] Appl. No. 786,557
[22] Filed Dec. 24, 1968
[45] Patented Apr. 6, 1971
[73] Assignee Monsanto Company
St. Louis, Mo.

[54] SUBNANOSECOND CURRENT PULSE GENERATOR
7 Claims, 2 Drawing Figs.

[52] U.S. Cl. .......... 307/263, 307/237, 307/264, 307/268, 307/270
[51] Int. Cl. .......... H03k 5/12
[50] Field of Search .......... 307/237, 263, 264, 268, 270

[56] References Cited
UNITED STATES PATENTS 3,191,062 6/1965 Forge .......... 307/263
3,200,267 8/1965 Cubert .......... 307/263
3,327,137 6/1967 Ovshinsky .......... 307/268
3,365,587 1/1968 Barr .......... 307/263

*Primary Examiner*—Donald D. Forrer
*Assistant Examiner*—R. C. Woodbridge
*Attorneys*—John D. Upham, Herman O. Bauermeister and Harold R. Patton

ABSTRACT: A pulse generator circuit including a pair of switching transistors and a constant current source coupled to an output terminal by a diode poled to deliver current to the load resistor in response to the switching of the transistor. While the pulse generating circuit is in its standby condition and during a predetermined portion of the switching cycle, the diode isolates the load circuit from the switching circuit. Actuation of the switching transistor and subsequent conduction of the diode produces a pulse waveform having the steep leading and trailing edges at the output terminal.

Patented April 6, 1971 3,573,502

2 Sheets-Sheet 1

INVENTOR
DAVID T. KAN
BY Harold [signature]
ATTORNEY

Patented April 6, 1971 3,573,502

2 Sheets-Sheet 2

INVENTOR
DAVID T. KAN
BY Harold R. Patton
ATTORNEY

SUBNANOSECOND CURRENT PULSE GENERATOR

FIELD OF THE INVENTION

The present invention relates generally to pulse generator circuitry, and more particularly, to a current pulse generator circuit adapted for generating subnanosecond pulses having steep leading and trailing edges.

BACKGROUND OF THE INVENTION AND DESCRIPTION OF THE PRIOR ART

Many conventional pulse generator circuits employ a switching device, such as the transistor, which is continuously coupled to the load circuit. In such pulse generator circuits the load circuit "sees" the entire switching waveform, which usually consists of leading and trailing edges having fast or steep portions, as well as other portions of lesser slope (slow portions). The slower portions of the waveform are contributed by such factors as the slow turn-on and turnoff times of the switching device and the relatively slow charging of stray capacitances, and the like. When most conventional pulse generator circuits, such as that described hereinabove, are operated over greater dynamic ranges, the slower portions of the waveform become more and more critical and adversely affect the overall speed of the circuit. That is, the pulse waveform produced by such circuits is deleteriously affected by certain switching circuit characteristics.

In addition, pulse generating circuits of the type described hereinabove require the use of many switching transistors or other devices connected in parallel, or special high-power switching transistors in order to withstand the required short circuit power dissipation, which may be 2 to 3 times greater than the rated output power of the pulse generator circuit.

Although the above-described conventional pulse generator circuits have served the general purpose, they have not proved satisfactory under all conditions of service for the reasons that (1) they are limited in their ability to generate pulses having extremely short rise and fall times, and (2) they require special high-output power devices capable of high-speed switching.

SUMMARY OF THE INVENTION

The general purpose of this invention is to provide current pulse generator circuitry which embraces all the advantages of similarly employed pulse-generating circuits, yet does not possess the aforedescribed disadvantages attendant with pulse generator circuits which utilize switching device connected to the load circuit at all times. To attain this, the present invention utilizes a unique combination of a switching circuit and a current source which are coupled to the load circuit by an interconnecting switching diode. A biasing diode reverse biases the interconnecting diode during the standby condition of the pulse generating circuit. Upon actuation of the switching circuitry, the interconnecting diode becomes conductive at a predetermined time after the switching is initiated. In this manner the load circuit does not "see" the slow portions of the switching waveform, and the switching circuitry is not required to handle the high power required by the load circuit, i.e. the constant current source supplies the power to the load.

A first object is to provide a pulse-generating circuit having a wide dynamic range and capable of providing output pulses having steep leading and trailing edges.

A further object of the present invention is the provision of a pulse generating circuit whose switching devices are not required to handle the full output power of the pulse generator.

Yet another object of the present invention is the provision of a pulse-generating circuit whose output terminal or load circuit is disconnected from the switching circuit after switching has taken place, thereby to deliver power directly from a current source circuit, rather than by means of the high-speed switching devices.

Still another object of the present invention is the provision of a pulse-generating circuit which is capable of high-speed operation without employing expensive high-power and high-frequency switching transistors.

In the present invention these purposes (as well as others apparent herein) are achieved generally by providing a constant current source which is coupled to an output terminal, and thence to a resistive load circuit by a switching diode poled to deliver current from the constant current source to the output terminal when biased in its forward direction. A switching circuit having a transistor in its output stage is coupled to a junction point between the constant current source and the interconnecting switching diode by the collector of the switching transistor. Also connected to the junction point is the biasing circuit including a biasing potential source and a diode which may be forward biased or reverse biased depending upon the state of conduction of the switching transistor. Switching of the output transistor of the switching circuit from its conducting state to its nonconducting state varies the biasing potential applied to the interconnecting switching diode, thereby to selectively forward and reverse bias it and deliver current pulses to the output terminal.

BRIEF DESCRIPTION OF THE DRAWINGS

Utilization of the present invention will become apparent to those skilled in the art from the disclosures made in the following description of a preferred embodiment, as illustrated in the accompanying drawings, in which.

DESCRIPTION OF THE PREFERRED EMBODIMENT

Figure 1:
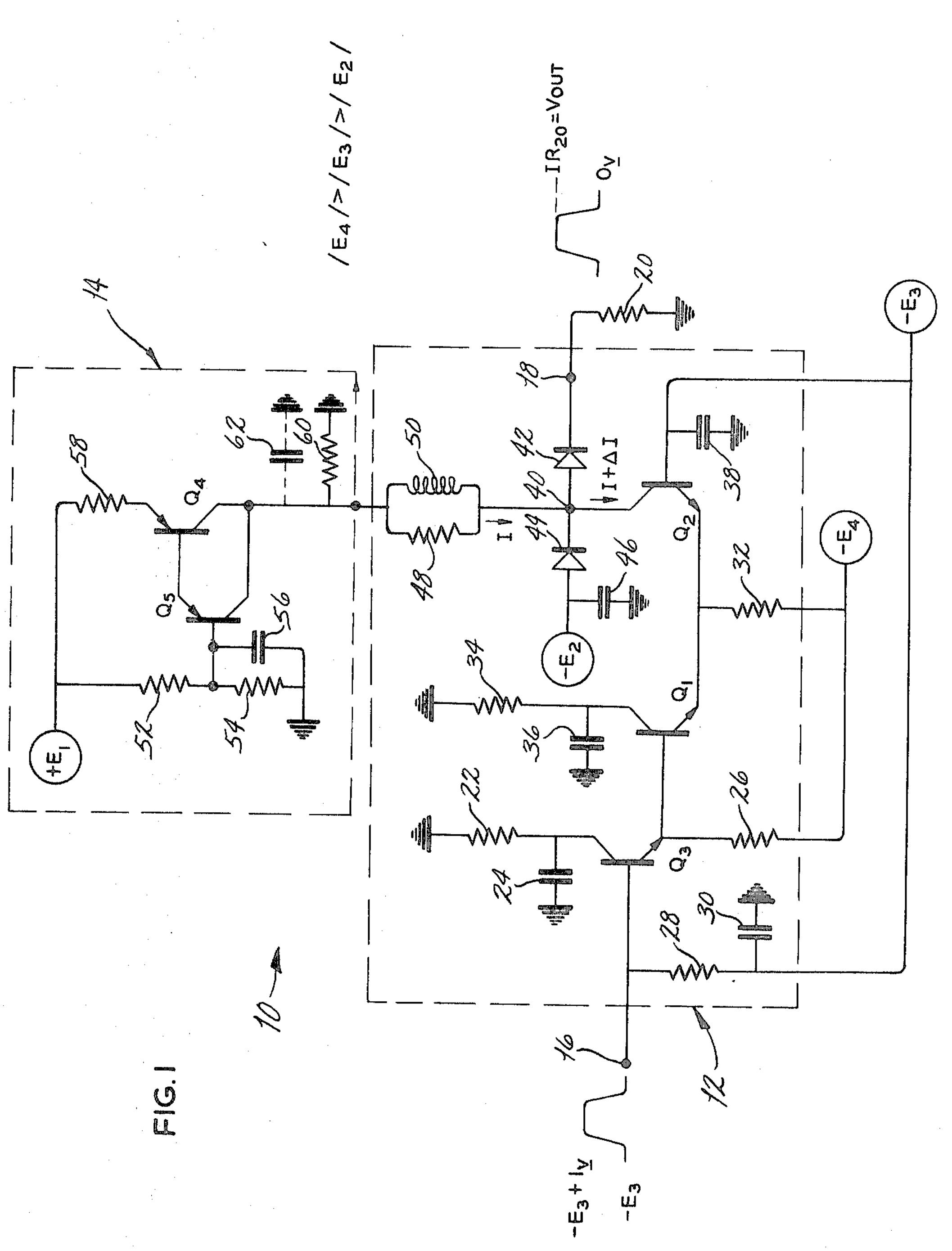
FIG. 1 is a schematic circuit diagram of a preferred embodiment of the current pulse generator of the present invention.

Referring now to the drawings, there is shown in FIG. 1 a pulse-generating circuit, generally designated 10, including a high-frequency switching circuit portion, indicated by the dashed line 12 and a substantially constant current source portion, generally indicated by the dashed line 14.

An input terminal and an output terminal for the pulse generator circuitry 10 are indicated at 16 and 18, respectively. The output terminal 18 is shown connected to a utilization or load circuit, represented as a resistor 20. The input terminal 16 is adapted to be connected to actuation circuitry, such as logic circuitry, for generating low-power signals for controlling the operation of the high-frequency switching circuit 12.

The input terminal 16 is connected to the base electrode of a transistor Q3 coupled to operate as an emitter-follower circuit. The collector electrode of the emitter-follower transistor Q3 is coupled to a reference potential (ground) by means of a current-limiting resistor 22 and a power supply bypass capacitor 24, while its emitter electrode is connected to a negative potential power supply terminal, $-E_4$, by means of a resistor 26. A power supply bypass capacitor 30 is connected between the resistor 28 and power supply terminal $-E_3$ and ground potential. It should be apparent that the value of the power supply $-E_4$ is greater than the value of the power supply $-E_3$.

Transistors Q1 and Q2 form a differential current-mode switch. The emitters of the switching transistors Q1 and Q2 are coupled to the negative power supply terminal, $-E_4$, by a resistor 32. The base electrode of the switching transistor Q1 is directly connected to the emitter electrode of the emitter-follower transistor Q3. The collector electrode of the switching transistor Q1 is coupled to ground potential by a current-limiting resistor 34 and a power supply bypass capacitor 36.

The base electrode of the switching transistor Q2 is directly connected to the negative power supply terminal, $-E_3$, and further coupled to ground potential by means of a power supply bypass capacitor 38. The collector electrode of the switching transistor Q2 is directly connected to a junction point 40.

The junction point 40 is coupled to the output terminal 18 of the pulse generator circuitry 10 by means of an interconnecting switching diode 42, the anode of the diode 42 being directly connected to the junction point 40 and its cathode being directly connected to the output terminal 18. The junction point 40 is further coupled to a negative biasing potential source, $-E_2$, by means of a diode 44, poled to conduct current to the junction point 40. A power supply bypass capacitor 46 is connected between the negative biasing potential $-E_2$ and ground potential.

The junction point 40 is further coupled to the constant current source portion 14 of the circuit 10 by an isolation network consisting of the parallel combination of a resistor 48 and an inductor 50.

The constant current source portion 14 of the circuit 10 consists of two power transistors Q4 and Q5 and a voltage divider, including resistors 52 and 54 connected between a positive power supply terminal, $+E_1$, and ground potential. The base electrode of the power transistor Q5 is connected between the voltage divider resistors 52 and 54, and further AC coupled to ground potential means of a capacitor 56. The emitter electrode of the power transistor Q4 is connected to the positive power supply terminal, $+E_1$, by means of a resistor 58, and its base electrode is directly connected to the emitter electrode of the power transitor Q5. The collector electrodes of the power supply transistors Q4 and Q5 are directly connected together, and further connected to the resistor 48 and inductor 50 comprising the isolation network. A resistor 60, having a value much greater than that of the load resistor 20, is connected between the collector electrodes of the power transistors Q4, Q5 and ground.

The dashed lines indicated at 62 represent the overall stray capacitance of the current source portion 14 of the pulse generator circuitry 10. This stray capacitance is dominated principally by the stray capacitance *Cob* between the collector electrode and the base electrode of the power transistor Q4.

OPERATION OF THE PULSE GENERATOR CIRCUIT

A constant current I is supplied by the constant current source portion 14 of the circuitry 10 to the junction point 40 at all times during the operation of the pulse generator. The circuit component and power supply parameters of the high-frequency switching portion 12 of the circuit 10 are chosen such that switching transistor Q2 is biased to its conducting state and the switching transistor Q1 is biased to its turned-off state with no signal applied to the input terminal 16. Furthermore, these parameters are chosen such that the collector current of the switching transistor Q2 is greater than the current I by an amount $\Delta$ I. The current $\Delta$ I flows through the biasing diode 44, and the potential at the junction point 40 is negative and equal to $-E_2$ $-0.6$ volts (where the forward biasing potential of the diode 44 is 0.6 volts). Since the potential at junction point 40 is negative, the diode 42 is cut off, and the output terminal 18 is at ground potential. Thus, in its standby condition, the load 20 of the pulse generator circuitry 10 is isolated from the switching circuitry portion 12 of the pulse generator circuitry 10.

When a positive-going step of a pulse having a peak voltage of about $-E_3+1$ volt or greater is applied to the input terminal 16 of the pulse generator circuitry 10, it is coupled by the high-speed, emitter-follower transistor Q3 to the base electrode of the first stage (transistor Q1) of the differential mode switch. This causes the switching transistor Q1 to switch from its nonconducting state to its conducting state, and consequently, as is well known, the transistor Q2 switches from its conducting state to its nonconducting state, that is, it turns off. As a result of the transistor Q2 turning off, and, in view of the fact that a constant current I is being supplied to the junction point 40, the biasing diode 44 must turn off. This results in the collector voltage V*c* of the switching transistor Q2 rising from a base or reference voltage of $-E_2$ $-0.6$ volts, as may be seen in FIG. 2 at time $t_0$.

As the collector voltage V*c* at the switching transistor Q2 rises, it initially rises slowly and in a nonlinear fashion as represented by the waveform portion *a* occuring during the time period $t_0 - t_1$. This portion *a* of the waveform V*c* is principally due to the inherent initially slow switching of the transistor Q2. The shape of portion *b* of the resultant waveform V*c* occurring during the time period $t1 - t_2$ is linear; this linear portion *b* resulting from the constant-current charging of stray capacitances during the switching operation. When the collector voltage V*c* reaches $+0.6$ volts, as indicated by the dash line A–A of FIG. 2, the diode 42 interconnecting junction point 40 and the output terminal 18 becomes forward biased, and a current step corresponding to the fast (greater slope) portion *c* of the voltage waveform V*c* appears across the output load resistor 20 during the time period $t_2 - t_3$. The rise time of the leading edge of the pulse appearing at the output terminal 18 is $t3 - t_2$ and is very steep in comparison to the portions *a* and *b* of the collector waveform V*c*. The portions *a* and *b* of the leading edge of the switching waveform are isolated from the load 20 because the diode 42 is cut off during the entire time period $t_2 - t_0$.

The trailing edge of the signal applied to input terminal 16 causes the switching transistors Q1 and Q2 to initiate their return to their original nonconducting and conducting states, respectively, at time $t_4$. The diode 42 continues to conduct until the potential at the junction point 40 reaches $+0.6$ volts, at which point it becomes reverse biased, and thereby isolates the load 20 from the slower switching action (see portions *d* and *e* of the waveform V*c*) of the switching circuit portion 12 of the pulse generator 10.

Figure 2:
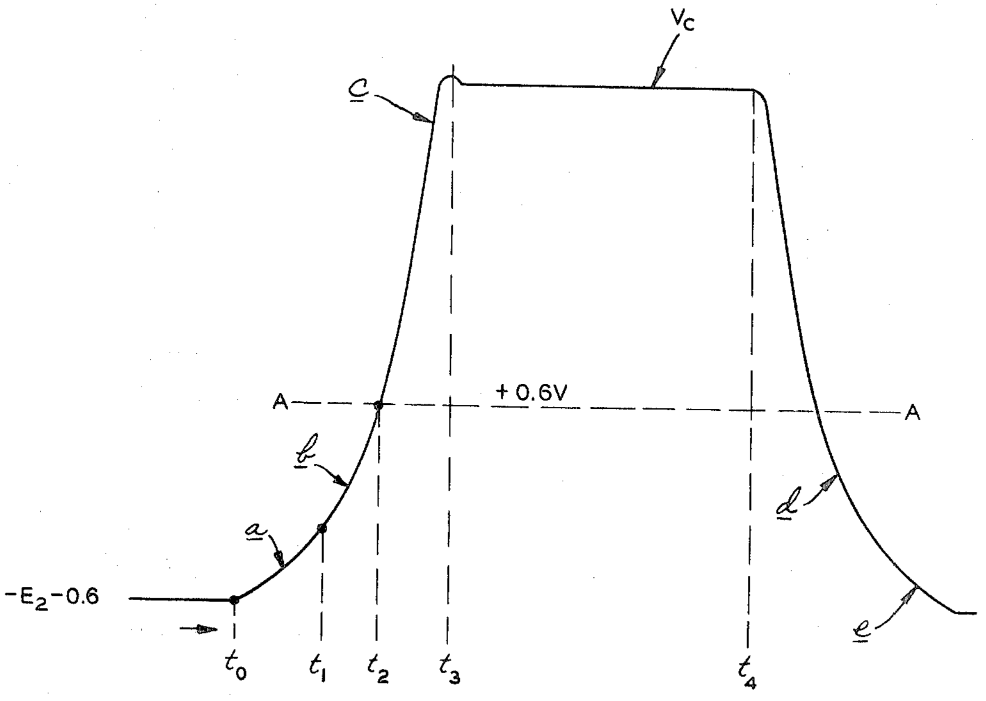
FIG. 2 is a detailed graphical representation of the voltage waveform occurring at the output of the switching circuitry of the pulse generator circuitry of FIG. 1.

Thus, it may be seen by a comparison of the voltage waveform V*c* and the waveform appearing at the output terminal 18 (the portion of the waveform of FIG. 2 above the dashed line A–A), that the pulse generator circuitry 10 takes advantage of the steep portions of the waveform of FIG. 2, resulting in considerable reduction of rise and fall times for the output pulse.

In addition, it may be seen that the output terminal 18 and load 20 are disconnected from the switching circuit portion 16 of the pulse generator circuitry 10 after the switching has taken place. After switching, they are connected by means of the diode 42 to the constant current portion 14 of the circuitry 10. As a result, power to the load 20 is supplied by the current source rather than by the high frequency switching transistors Q1 and Q2. Therefore, lower power and higher frequency devices may be used in the pulse generator circuitry 10. That is, the maximum power dissipation of the switching transistors Q1 and Q2 need only be a small fraction of the total rated output power of the pulse generator circuitry 10 and therefore can be higher frequency transistors.

In choosing the values for the isolation network resistor 48 and inductor 50, the value ($R_{48}$) for the resistor 48 is chosen to be equal to the value ($R_{60}$) of the resistor 60 and the value ($L_{50}$ in henries) for the inductor 50 is chosen to be equal to ($R_{60}^2$ $C_{62}$. In this manner the impedance looking into the constant current source portion 14 of the circuitry 10 from the collector electrode of the switching transistor Q2 is equal to $R_{60}$ *a*— substantially all frequencies of operation.

Many modifications and variations in the present invention are possible in view of the above teachings. Therefore, it is to be understood, that the invention may be practiced otherwise than as specifically described with reference to the preferred embodiment.

I claim:

1. Current pulse-generating circuitry, comprising:
a constant current source;
load mean;
a first diode interconnected between and poled to deliver current from said constant current source to said load means when biased in its forward direction;

a switching transistor having its collector coupled to a junction point between said constant current source and said first diode, said switching transistor being operable in response to voltage signals applied between its base and emitter electrodes to switch between a conducting state and a nonconducting state;

a biasing potential source;

a second diode connected between said biasing potential source and said junction point and forward biased thereby when said switching transistor is in its conducting state;

whereby the switching of said transistor from its conducting state to its nonconducting state causes said first diode means to switch from its nonconducting state to its conducting state and thereby deliver current pulses having steep leading and trailing edges to said load means;

2. The circuitry as defined in claim 1, together with:

an isolation network coupled between said collector of said switching transistor and a said constant current source;

whereby said switching transistor is isolated from the stray capacitance in the output circuit of said constant current source.

3. The circuitry as defined in claim 2, wherein said isolation network comprises the parallel combination of a resistor and an inductor.

4. Pulse-generating circuitry, comprising:

a current source;

an output terminal adapted to be connected to a utilization circuit;

a diode interconnecting said current source and said output terminal and poled to deliver current thereto when forward biased;

biasing circuit means electrically coupled to said interconnecting diode;

switching circuit means electrically connected to said biasing circuit means for selectively causing said biasing circuit means to forward and reverse bias said interconnecting diode; and whereby current pulses may be delivered to said output terminal from said current source by selectively forward and reverse biasing said interconnecting diode.

5. A pulse-generating circuit as defined in claim 4, wherein the actuation of said biasing circuit means to forward bias said interconnecting diode is time delayed in the switching of said switching circuit means, thereby to isolate said output terminal from said switching circuit means during a predetermined portion of the switching cycle.

6. The pulse-generating circuitry as defined in claim 4, wherein:

said biasing circuit means, comprises;

a source of biasing potential; and a diode electrically connecting said biasing potential source and said interconnecting diode.

7. The pulse-generating circuitry as defined in claim 5, wherein said switching circuit means, comprises;

a two stage differential mode switch including two emitter-coupled transistors, one transistor having its base electrode coupled to an input terminal of said pulse generator circuitry and the other transistor having its collector electrode coupled to said biasing circuit diode to selectively control the conduction thereof.